UNITED STATES PATENT OFFICE.

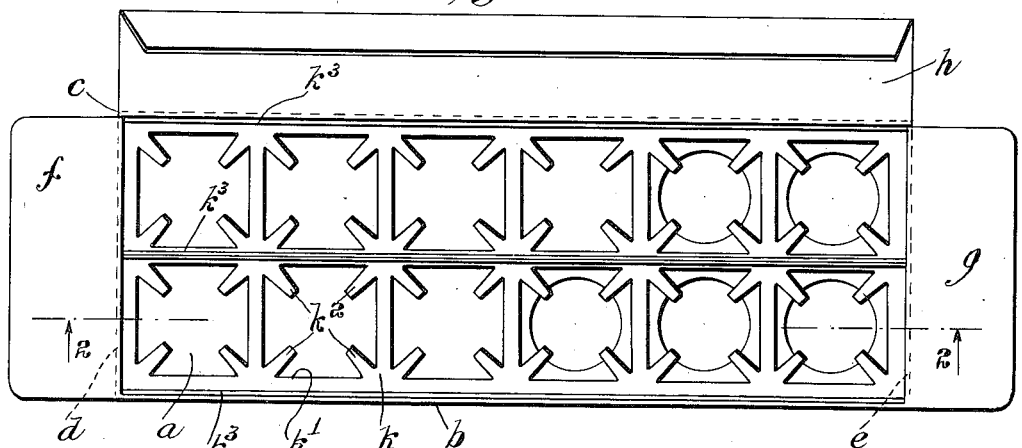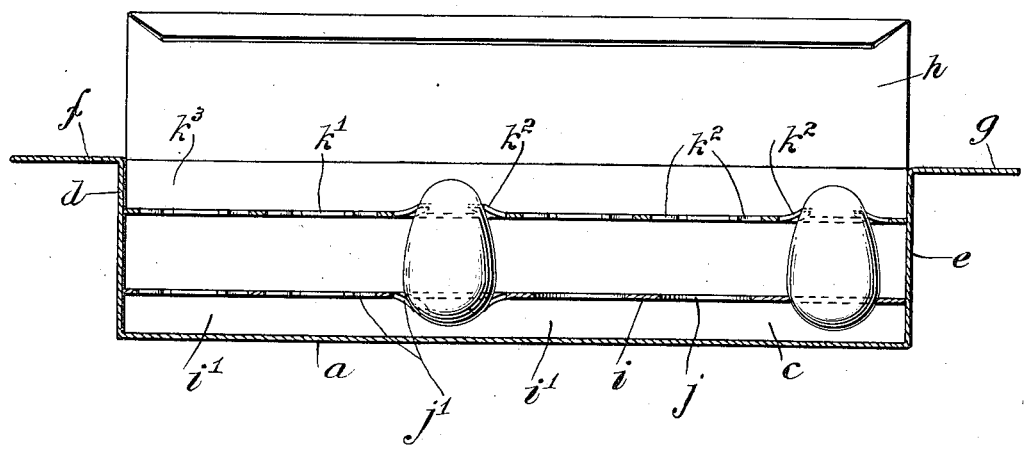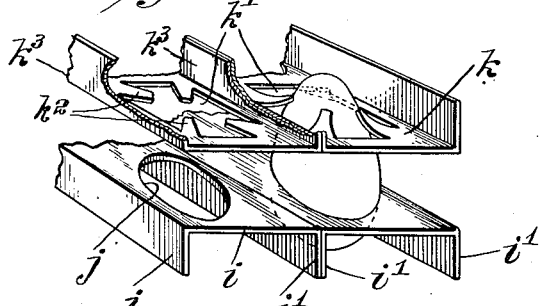

WILLIAM G. BROWNE, OF DENVER, COLORADO.

RECEPTACLE FOR SHIPPING EGGS.

1,174,666.      Specification of Letters Patent.      Patented Mar. 7, 1916.

Application filed April 20, 1914. Serial No. 833,043.

*To all whom it may concern:*

Be it known that I, WILLIAM G. BROWNE, a citizen of the United States, residing at Denver, in the county of Denver and State of Colorado, have invented certain new and useful Improvements in Receptacles for Shipping Eggs, of which the following is a specification, reference being had therein to the accompanying drawings, which form a part thereof.

My invention relates to receptacles for shipping eggs and more particularly to a type thereof adapted to be used for the transportation of eggs and other similar fragile articles.

To adapt a receptacle or box for use in packing eggs for transportation in small quantities and under conditions when a careful handling of packages cannot be anticipated, as when passing through the mails, it must be light of weight, sufficiently stiff or rigid to preclude possibility of being crushed, and sufficiently inexpensive both as to material used, and labor in manufacturing, to warrant a single use. In addition to these characteristics, a receptacle made in accordance with my invention is capable of holding a number of eggs, each of which is individually supported so as to be spaced away from other eggs, and firmly held in place in a manner to prevent the eggs from being shaken together, or being brought into contact with those portions of the outer walls of the receptacle which are subject to knocks and jars from other packages. Furthermore, the support within the receptacle in addition to holding the eggs or other articles away from the outer walls of the box body and each other, are adapted to form a more or less flexible support therefor, so as to relieve the eggs from the effects of the jars to which the box is liable. These supports are also so constructed as to receive eggs of different sizes while holding them all with substantially the same degree of firmness.

The invention consists primarily in a receptacle for shipping eggs embodying therein a box body having a closed bottom and side walls, a resilient bottom tray, stiffening ribs carried thereby whereby said tray is spaced away from the bottom of said box, said tray having openings therethrough to receive the eggs, a removable resilient tray having a close fit within said box body adapted to extend substantially parallel with said first named tray, said removable tray having openings therein adapted to register with the openings in said bottom tray, a removable closure cover for said box body, and coöperating means carried by said removable tray and said cover whereby said tray will be forced into, and held firmly in, engagement with the eggs when said cover is in place, and in such other novel features of construction and combination of parts as are hereinafter set forth and described and more particularly pointed out in the claims hereto appended.

Referring to the drawings: Figure 1 is a plan view of a receptacle embodying my invention; Fig. 2 is a vertical section on the line 2—2 of Fig. 1, and Fig. 3 is a perspective view of a portion of the trays showing an egg in place therein.

Like letters refer to like parts throughout the several views.

In the accompanying drawings, I have shown a receptacle including therein an ordinary paper box body having a closed bottom *a* side walls *b—c*, end walls *d—e*, and a closure cover comprising the end flaps *f—g* and hinged top flap *h*. This box body and cover may take any desired form, however, but preferably a folding box body should be used to facilitate the handling and shipment thereof in quantities.

Adjacent the bottom *a* of the box body, and supported therefrom by means of ribs or flanges *i' i'* is a bottom tray *i* provided with a plurality of openings *j* therein adapted to receive one end of the eggs to be packed in the box. The openings *j* may be circular or they may be rectangular with inwardly projected tongues *j'*, as shown in the drawings, either construction being adapted to receive eggs of different sizes. The ribs or flanges *i'* are arranged upon the tray so as to be positioned adjacent to opposite sides of the box body, and centrally thereof, and intermediate the openings *j*. All such ribs or flanges extend parallel with the side *b—c*, thus serving the threefold function of permanently spacing the tray *i* away from the bottom *a*, stiffening the bottom *a* of the box and the ends *d—e* thereof, and allowing sufficient flexure of the top of the tray to afford a yielding support for the eggs which will absorb ordinary jars and jolts upon the box body. The tray *i* is preferably made of cardboard, formed or bent to shape. When a collapsible box body is used, the tray is loosely fitted in and hence separable from, the said body, but if a formed box body be employed, it may be permanently secured in place toward the bottom of the box. The flanges $i'$ are of a depth sufficient to hold any sized egg out of contact with the bottom $a$ of the box, thus permitting a limited inward movement of said bottom without exerting pressure upon, or permitting external objects to impact, through said bottom $a$, against the eggs. To hold the eggs firmly upon said tray $i$, I provide a second tray $k$ adapted to occupy a plane substantially parallel with the tray $i$, said tray having therein a plurality of openings $k'$ which are adapted to come into substantial register with the openings $j$. Inasmuch as the dimensions of no two eggs are exactly the same and as all eggs must be firmly held in place irrespective of their size, the edge of each opening $k'$ must be sufficiently flexible to permit the said tray to adjust itself to all of the eggs with a sufficient degree of firmness to prevent movement of the eggs contained between the two trays. Preferably, I secure this result by providing the tray $k$ with the tongues $k^2$ projecting inwardly of each opening $k'$ which tongues are sufficiently flexible to readily yield when forced over the end of an egg.

The tray $k$ is adapted to be removed from the box and by reason of this removability of said tray, it is essential to provide coöperating means between said tray and the cover, so that with the closing of the box by means of the cover said tray will not only be forced downwardly, but will be held in its position upon the eggs.

In order to secure the desired permanency in the positioning of the tray $k$, and at the same time stiffen the box so as to prevent its collapsing or being crushed about the top thereof, I provide the tray $k$ with upwardly extending ribs or flanges $k^3$ which flanges are arranged adjacent each side $b$—$c$ of the box and intermediate said sides extending from one end $d$ to the other $e$ of the box. The tray $k$ is also preferably made of cardboard either formed or bent to shape, thus affording the desired flexibility to the tray while securing the desired stiffening effect both lengthwise and sidewise of the box.

By the construction and arrangement of trays and ribs or flanges herein described, the box is stiffened both lengthwise and sidewise thereof, the flanges $i'$—$k^3$ serving to reinforce said box lengthwise, and the trays themselves serving to reinforce it sidewise.

In packing eggs for shipment in a box made in accordance with my invention, the eggs are placed upon the tray $i$ preferably with the large end in the openings $j$ therein; and when the desired number of eggs have been packed, the tray $k$ is inserted in the upper part of the box with the flanges $k^3$ presented upwardly. In positioning the tray $k$ in the box, the openings $k'$ therein will pass over the small ends of the eggs. When the cover is placed on the box, it will engage the flanges $k^3$ thus pressing the tray $k$ downwardly, the tongues $k^2$ yielding so as to adapt themselves to the different eggs and yet hold these eggs firmly in position. When the box is fully packed, all of the eggs will be firmly held between the trays $i$ and $k$ so as to prevent any possible movement of the eggs, and the eggs will also be held by said trays in a position where they cannot be engaged by the bottom, cover or sides of the box unless the same be actually punctured or crushed.

The various ribs and the trays will stiffen the sides, ends, bottom and top of the box so as to produce a fairly rigid package. If the box be thrown about, however, there is likelihood of breakage of such fragile articles as eggs, and it is to meet this condition that the trays are made of fairly light cardboard so as to be sufficiently springy or resilient to yield slightly under such treatment, and thus prevent breakage of the eggs thereby.

In the accompanying drawings, I have shown two trays $i$ and two trays $k$ in a box adapted to hold one dozen eggs. By increasing the dimensions of the outer box the number of said trays may be increased; or if desired, a smaller box may be used and a single set of trays employed in connection therewith.

It is not my intention to limit the invention to the form of box or other precise details shown in the accompanying drawings, it being apparent that such are largely matters of choice and may be varied without departing from the spirit and scope of the invention.

Having described the invention what I claim as new and desire to have protected by Letters Patent are:

1. A receptacle for shipping eggs embodying therein a box body having a closed bottom and side walls, a resilient bottom tray having stiffening ribs thereon whereby said tray is spaced away from the bottom of said box, said tray having openings therethrough to receive the eggs, a removable resilient tray having a close fit with said box body and being adapted to extend substantially parallel with, be spaced away from and have no engagement with said first named tray, said removable tray having openings therethrough adapted to register with the openings in said bottom tray, a removable closure cover for said box body, and coöperating means between said removable tray and said cover whereby said tray will be forced toward said resilient bottom tray into, and held firmly in engagement with the eggs when said cover is in place.

2. A receptacle for shipping eggs embodying therein a box body having a closed bottom and side walls, a resilient bottom tray having stiffening ribs thereon whereby said tray is spaced away from the bottom of said box, said tray having openings therethrough to receive the eggs, a removable resilient tray having a close fit with said box body and being adapted to extend substantially parallel with, be spaced away from and have no engagement with said first named tray, said removable tray having openings therethrough adapted to register with the openings in said bottom tray, a removable closure cover for said box body, and flanges or ribs upon said removable tray projecting upwardly of and beyond said box body whereby the placing of the cover upon said box body will through engagement with said flanges or ribs force said tray toward said resilient bottom tray into, and hold it firmly in, engagement with the eggs.

3. A receptacle for shipping eggs embodying therein a box body having a closed bottom and side walls, a resilient bottom tray having stiffening ribs thereon whereby said tray is spaced away from the bottom of said box, said tray having openings therethrough to receive the eggs, a removable resilient tray having a close fit with said box body and being adapted to extend substantially parallel with, be spaced away from and have no engagement with said first named tray, said removable tray having openings therethrough adapted to register with the openings in said bottom tray, the edge of the tray about said openings being flexible to permit said tray to be positioned upon eggs of different sizes, a removable closure cover for said box body, and coöperating means between said removable tray and said cover whereby said tray will be forced toward said resilient bottom tray into, and held firmly in engagement with the eggs when said cover is in place.

4. A receptacle for shipping eggs embodying therein a box body having a closed bottom and side walls, resilient bottom tray having stiffening ribs thereon whereby said tray is spaced away from the bottom of said box, said tray having openings therethrough to receive the eggs, a removable resilient tray having a close fit with said box body and being adapted to extend substantially parallel with, be spaced away from and have no engagement with said first named tray, said removable tray having openings therethrough adapted to register with the openings in said bottom tray, flexible tongues formed upon said tray and projecting partially across said openings respectively, a removable closure cover for said box body, and coöperating means between said removable tray and said cover whereby said tray will be forced toward said resilient bottom tray into, and held firmly in engagement with the eggs when said cover is in place.

5. A receptacle for shipping eggs embodying therein a box body having a closed bottom and side walls, a resilient bottom tray having stiffening ribs thereon whereby said tray is spaced away from the bottom of said box, said tray having openings therethrough to receive the eggs, a removable resilient tray having a close fit with said box body and being adapted to extend substantially parallel with, be spaced away from and have no engagement with said first named tray, said removable tray having openings therethrough adapted to register with the openings in said bottom tray, flexible tongues formed upon said tray and projecting partially across said openings respectively, a removable closure cover for said box body, and flanges or ribs upon said removable tray projecting substantially parallel with the sides and extending above the top edge of said box body whereby the placing of the cover upon said box body will through engagement with said flange or ribs force said tray toward said resilient bottom tray into, and hold it firmly in, engagement with the eggs.

6. A receptacle for shipping eggs embodying therein a pasteboard box body having a closed bottom and side walls and a movable closure cover, a plurality of independent parallel trays, of flexible material having alined openings therethrough, and flanges or ribs on said trays respectively, said ribs or flanges upon said trays respectively being projected in opposite directions whereby one of said trays will be supported away from the bottom of said box body and the other of said trays will be forced by the cover toward the said first named tray into engagement with the eggs between said trays and be spaced away from said cover, and said box body will be stiffened or reinforced in all directions by said trays and said flanges.

In witness whereof, I hereunto affix my signature this 13 day of April 1914, in the presence of two subscribing witnesses.

WILLIAM G. BROWNE.

Witnesses:
W. B. MILLIKEN,
I. M. LOFTUS.